Dec. 1, 1959          H. R. MARINI          2,915,423
METHOD AND APPARATUS FOR GLASS CHIP REMOVAL
Filed April 15, 1957                    2 Sheets-Sheet 1
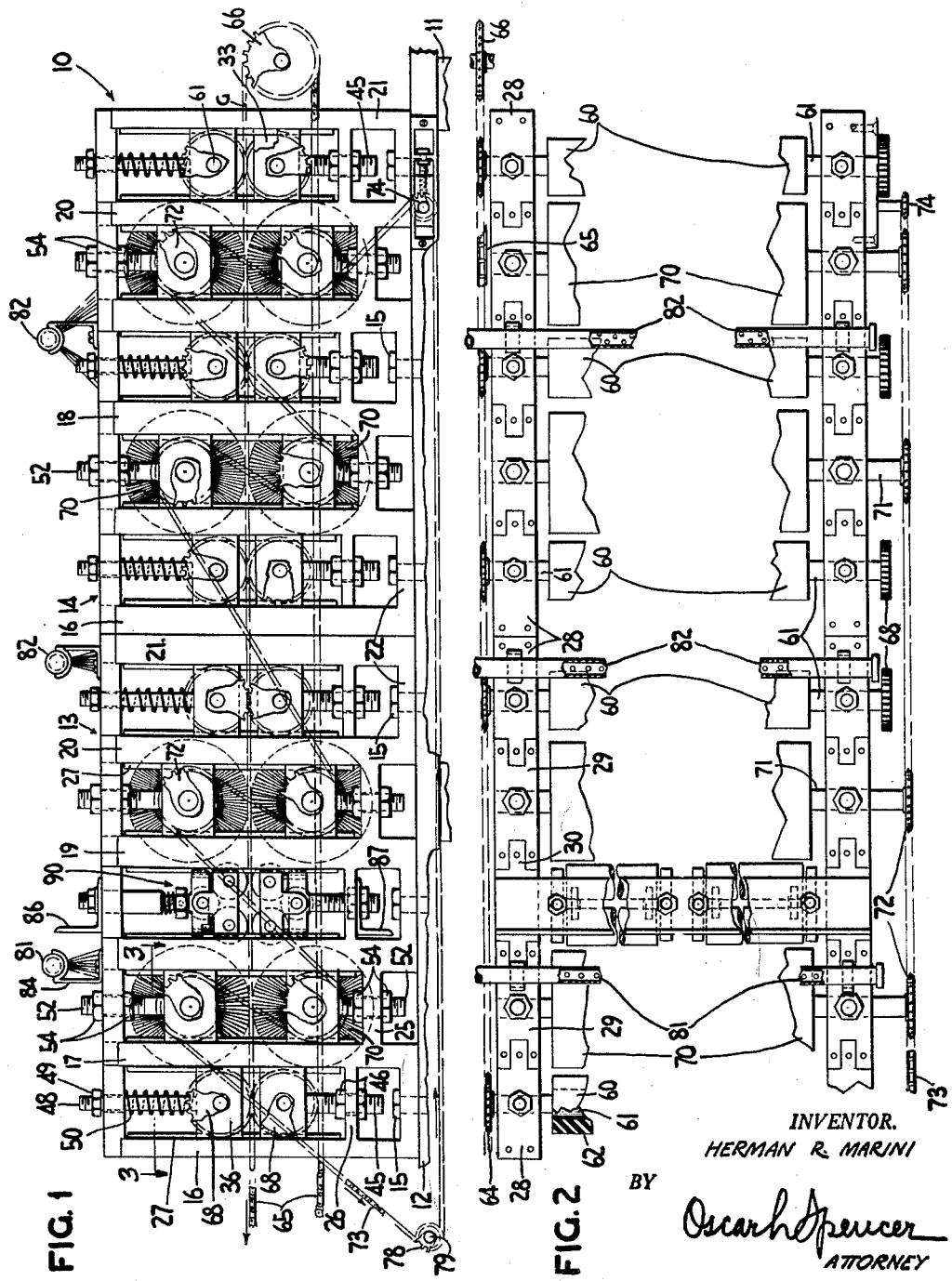
INVENTOR.
HERMAN R. MARINI
BY
Oscar H. Spencer
ATTORNEY Dec. 1, 1959  H. R. MARINI  2,915,423
METHOD AND APPARATUS FOR GLASS CHIP REMOVAL
Filed April 15, 1957  2 Sheets-Sheet 2
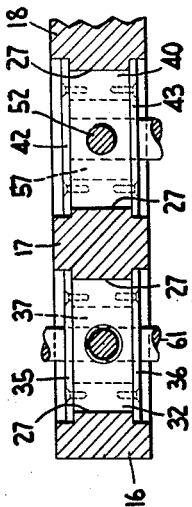
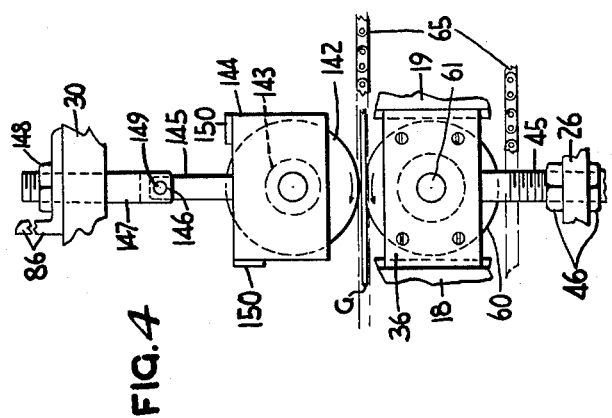
INVENTOR.
HERMAN R. MARINI
BY
Oscar L. Spencer
ATTORNEY

United States Patent Office 2,915,423
Patented Dec. 1, 1959

2,915,423

METHOD AND APPARATUS FOR GLASS CHIP REMOVAL

Herman R. Marini, New Kensington, Pa., assignor to Pittsburgh Plate Glass Company, Allegheny County, Pa., a corporation of Pennsylvania Application April 15, 1957, Serial No. 652,761

12 Claims. (Cl. 134—9)

This invention relates to a method and an apparatus for glass chip removal, i.e., the removal of a glass chip on a surface of a glass sheet.

When a glass sheet is cut to provide smaller glass sheets, there is a tendency for glass chips to be formed and to travel from the place of occurrence to a surface of one of the glass sheets being formed. These chips are usually thin, being of the order of 0.005 to 0.01 inch in thickness with at least one flat surface. When one of these chips impinges on a surface of the smaller glass sheet so that the flat surface of the chip contacts the surface of the smaller glass sheet, the glass chip tenaciously adheres to the surface of the glass sheet. It is very difficult to remove the glass chip from the surface of the glass sheet. The cohesive bond between the chip and the glass sheet is sufficiently strong that in some cases the washing of the glass sheet by the application of water and using a brush will not remove some of these glass chips.

When glass sheets having the glass chips adhering thereto are stacked for shipment with the glass sheets touching one another, the glass chips can cause damage to the adjacent glass sheet. This damage has occurred during the transfer of a stack of glass sheets from one part of a plant to another for use of the glass sheets in the various subsequent fabricating operations. For example, glass sheets have been cut into sheets known as block size, i.e., smaller, glass sheets of rectangular or other configuration that are slightly larger than the glass sheets cut to pattern therefrom for the manufacture of laminated curved windshields or the manufacture of curved backlights for automobiles. The shipment of the block-size sheets in a stacked arrangement from one part of the plant to another results in some damage of the sheets. The cutting of the block-size sheets to pattern produces additional glass chips that adhere to the surface or surfaces of the pattern cut glass sheets.

In the conventional manufacture of laminated curved windshields, a pair of glass sheets cut to pattern is passed through a washer having a number of pairs of resilient pinch rolls for moving the glass sheets through the washer and having opposed pairs of rotary nylon brushes between the pairs of pinch rolls. Water containing detergent is fed to the nylon brushes for washing the glass sheets. This operation removes most of the glass chips that have been formed in the previous cutting operations, but in spite of this vigorous treatment some of the glass sheets passing through the washer have glass chips still adhering to the glass surface or surfaces.

In the conventional subsequent operation, the sheets are air dried and one surface of one of the pair of sheets is coated with a parting agent. The pair of sheets is then assembled so that the parting agent separates the sheets. The assembled pair with the parting agent therebetween is placed on a bending mold and the latter is passed through a lehr for bending the glass sheets to form a matched pair of curved sheets. The matched pair after cooling are removed from the bending mold. A plasticized thermoplastic interlayer is placed between the two sheets of the matched curved pair to form a composite assembly which is subjected to a laminating procedure for bonding the interlayer to the two glass sheets. In one of the laminating procedures the composite assembly is heated and then passed between a pair of resilient nipper rolls to remove air from the sandwich or assembly and to provide sufficient bonding in at least the marginal area of the assembly. The resultant product is placed directly in oil for treatment at elevated temperature and pressure to complete the bond of the interlayer to the two glass sheets.

For the manufacture of tempered backlights for automobiles, a glass sheet cut to pattern is placed on a bending mold after the washing and drying treatment mentioned above but without the application of a parting agent. The bending mold is then passed through a bending lehr and after the glass sheet is heated in the lehr for bending of the glass sheet it is cooled to a lower uniform temperature across the sheet and subjected to air blasts for tempering the curved glass sheet.

When the washer does not remove a glass chip, the glass sheet in the bending lehr will have the glass chip fused thereto as a result of the high temperature used for bending. This results in an optical defect in the curved glass sheet and can be the basis for rejection of the product. Furthermore, in the manufacture of the laminated product, the presence of a glass chip or chips on one or both of the opposing surfaces of the pair of glass sheets can keep the two glass sheets sufficiently far apart to prevent bonding of the interlayers throughout the entire area of the composite assembly. This results in an air space or a void in an area of the final product. The glass chip can also cause damage in the preliminary pressing operation when passing the composite assembly between the pair of nipper rolls. It can cause damage in the final autoclave treatment for laminating. In addition the glass chip can cause an optical defect and can be the basis for rejection of the final fabricated product.

The glass chips that are not removed by the conventional washer described above can be removed by means of a razor blade but obviously this would require detailed inspection of each glass sheet before bending and manual labor for the removal of the chips.

It is an object of the present invention to provide a method and apparatus for the removal of glass chips from a glass sheet.

It is another object of this invention to provide an apparatus for automatically removing glass chips from the surface of the glass sheet.

It is a further object of the present invention to provide a washer having incorporated therein an apparatus for treating the glass chips otherwise not removed by the rotary brushes of the washer.

These and other objects of the present invention will be apparent to one skilled in the art from the following description of a preferred embodiment of the method and a preferred embodiment of the apparatus of the invention, illustrated as a modification of a conventional washer for glass sheets, when taken in conjunction with the drawings in which like parts are designated by like numerals. The drawings are as follows:

Fig. 1 is a fragmentary elevation, partially broken away, of a glass sheet washer using the glass chip crushing assembly or apparatus of the present invention;

Fig. 2 is a fragmentary plan view of the washer of Fig. 1;

Fig. 3 is an enlarged fragmentary horizontal cross section taken along the line 3—3 of Fig. 1; and Fig. 4 is a fragmentary elevation of a washer showing the details of a glass chip crushing assembly in a glass sheet washer.

I have found that glass chips can be removed from surfaces of glass sheets even when tenaciously adhering thereto by a method that first presses a body having a rigid contacting portion against the glass chips while supporting the glass sheets. The rigid body is pressed against the glass chips with sufficient pressure to crush or pulverize the glass chips, thereby forming considerably smaller glass particles. The smaller glass particles that are formed can be very readily removed from the glass surface by a conventional technique such as by the use of a brush and wash water.

When this method is carried out, it was discovered that the glass chips could be crushed or pulverized without producing any scratches in the glass sheet surface in most cases. In the few instances that scratches were produced, they were so minute that it would be necessary to detect them by the use of some magnifying means, i.e., they were not apparent to the naked eye. Of course, even these minor scratches would not be detectable in most cases when the glass sheets are used as a pair to form a laminated glass article, because with the scratches on opposed surfaces the thermoplastic interlayer flows into the scratch area. This minimizes detection of minor scratches.

The crushing action in the process of the present invention can be accomplished in numerous ways. An example is the application of the method by the apparatus of the invention as illustrated in the modified washer for the washing of pairs of glass sheets cut to pattern for the manufacture of laminated curved glass windshields.

Referring to Figs. 1 and 2, a washer generally indicated at 10 has support legs 11 on which are secured a pair of side rails 12. Between the pair of side rails 12 and extending downwardly is a catch pan (not shown). A pair of cast support members generally indicated at 13 and 14 is secured on each of side rails 12 by bolts 15. Each of cast support members 13 and 14 has upright portions 16, 17, 18, 19, 20 and 21.

For both cast support members 13 and 14 there are horizontal portions 22 forming part of the base and joining upright portion 16 to upright portion 17, upright portion 18 to upright portion 19, and upright portion 20 to upright portion 21. Bolts 15 securing cast support members 13 and 14 to side rails 12 are bolted through base portions 22. The upright portions 16 through 21 of cast supports 13 and 14 are also integral with horizontal support portions 25 and 26, the latter joining the upright portions that are joined by base portions 22 and being spaced from base portions 22. Each of opposed surfaces of upright portions 16 and 17, the opposed surfaces of upright portions 17 and 18, the opposed surfaces of upright portions 19 and 20, and the opposed surfaces of portions members 20 and 21 is provided with ribs 27 extending upwardly above horizontal portions 25 and 26. Ribs 27 serve as guide rails. Cap plates 28, 29 and 30 are secured to the top ends of upright portions 16 through 21.

Between upright portions 16 and 17 and between upright portions 20 and 21 for cast support members 13 and 14 and between upright portions 18 and 19 for support members 14 on rails 12 are mounted top and bottom bearing retainers 32 and 33, respectively, each of which is provided with retainer cover plates 35 and 36 screwed thereto. The plates 35 and 36 are wider than bearing retainers 32 and 33. Their vertical margins abut ribs 27, thereby preventing displacement of bearing retainers 35 and 36 or bearings 37 (Fig. 3) in retainers 32 and 33 along the axes of bearings 37. Similarly, top and bottom retainer bearings 40, each with retainer cover plates 42 and 43, are mounted between upright portions 17 and 18, and between upright portions 19 and 20 of cast support members 13 and 14 on rails 12 so that the vertical margins of retainer cover plates 42 and 43 abut ribs 27.

Each of the bottom retainer bearings 33 has an integral threaded rod 45 which extends downwardly through an aperture of larger diameter in horizontal portion 26. The bearing retainer 33 is secured in position by nuts 46 on rod 45. Each of the bearing retainers 32 has an integral rod 48 extending upwardly through a larger aperture in cap plate 28 or 30. The top threaded end of each rod 48 has a nut 49 that limits the downward displacement by gravity of bearing retainers 32. A spring 50 is mounted on rod 48 below cap plate 28 or 30 to oppose upward displacement of bearing retainer 32.

Each of the bearing retainers 40 has an integral threaded rod 52. The threaded rod 52 of each top bearing retainer 40 extends through a larger aperture in cap plate 29. Each top bearing retainer 40 is secured in position by nuts 54 on threaded rod 52. Similarly, the threaded rods 52 of bottom bearing retainers 40 extend through larger apertures in horizontal portions 25 and bearing retainers 40 are secured in position by nuts 54 on threaded rods 52. Bearings 57 are mounted in bearing retainers 40.

The washer 10 is provided with sets of top and bottom pinch rolls 60 for conveying glass sheets G through washer 10. Delivery and take-off conveyors (not shown) of a conventional type are provided at opposite ends of washer 10. Each of the pinch rolls 60 has a steel shaft 61 which is mounted at one end in bearing 37 on cast support member 13 or 14 on one side rail 12 and mounted at the other end in bearing 37 on cast support member 13 or 14 on the other side rail 12. Both ends of shaft 61 extend beyond bearings 37. Roll 60 has a rubber sleeve 62 snugly fitted on shaft 61 between bearings 37.

The rear end (as viewed in Fig. 1) of each shaft 61 of the bottom pinch rolls 60 has keyed thereon a sprocket 64. A chain 65 engages the tops of sprockets 64 and engages an idler sprocket 66 rotatably mounted on a support (not shown). The chain is driven, in a direction indicated by the arrow, by a sprocket and motor (not shown). Gears 68 are keyed on the front ends of shafts 61 of top and bottom rolls 60. The bottom rolls 60 are rotated by chain 65 and sprockets 64 and will rotate top rolls 60 by gears 68.

Nylon brush rolls 70 of a conventional type are mounted in bearings 57 to provide pairs of opposed top and bottom brush rolls 70 for briskly brushing glass sheets that pass between them. The rolls 70 have shafts 71 that extend beyond the front bearings 57. Sprockets 72 are keyed on shafts 71. All of the sprockets 72 are engaged by a chain 73 as shown in Fig. 1, i.e., so that the top brush rolls 70 will rotate in the opposite direction to top pinch rolls 60 and bottom brush rolls 70 also will operate in the opposite direction to bottom pinch rolls 60. The chain 73 engages a sprocket 74 adjustably and rotatably mounted on side rail 12. The chain 73 is driven by a sprocket 78 keyed on shaft 79 mounted on a support (not shown) and rotated by a power source (not shown).

Liquid spray pipe 81 and pipes 82 are mounted on cap plates 28, 29 and 30 on side rails 12 by brackets 84. The liquid spray pipes 81 and 82 are perforated at the bottom as shown in Fig. 2. Water containing a detergent is fed to pipes 82 from a source (not shown). Rinse water is fed to pipe 81 from a source (not shown).

An angle iron 86 is secured to cap plates 30 on cast support members 13. An angle iron 87 is secured to the under surfaces of horizontal portions 26 between upright portions 18 and 19 of cast support members 13. A crusher roll assembly, that is illustrated in Figs. 1 and 2, is generally indicated at 90. This particular crusher roll assembly is described and claimed in copending application Serial No. 652,762 filed by Victor S. Floyd on April 15, 1957, and entitled "Apparatus for Glass Chip Removal."

In an embodiment of the crushing assembly of the invention that is shown in Fig. 4, the angle iron 86 is used in washer 10 but angle iron 87 is not required. A pair of steel rolls 142 is rotatably mounted by bearings 143 mounted in bearing retainers 144 which have integral rods 145 extending upwardly between the bottom clevis end 146 of rod 147 threaded at the top end. A nut 148 is screwed on rod 147 to limit downward movement of rod 147 by resting on angle iron 86. By this arrangement each of the steel rolls 142 is adjustably positioned and can pivot about pins 149 mounted in apertures of clevis ends 146 of rods 147. The pair of bearing retainers 144 for each of the two rolls 142 is connected by bars 150 welded thereto.

The bottom portion of this crushing assembly of Fig. 4 has a pinch roll 60 adjustably mounted on horizontal portions 26 between upright portions 18 and 19 of cast support members 13 by bearings 37, bearing retainers 33, rods 45 and nuts 46. The roll 60 extends entirely from one cast support member 13 to the other and is driven at one end in the same manner as bottom rolls 60 for the pairs of opposed pinch rolls 60 previously described.

Referring to Fig. 4, the top surface of bottom roll 60 is positioned by rods 45 and nuts 46 so that it is in the horizontal plane of the other bottom rolls 60. The steel rolls 142 are adjustably supported by rods 145 and stop nuts 148 resting on angle iron 86 so that preferably the steel rolls 142 are spaced slightly above the expected top surface of the glass sheets passing thereunder. It has been found that it is possible to obtain considerable improvements in glass chip removal by steel roll 142 in washer 10 even when the major part of the time roll 142 engages the top surface of the glass sheet, although in the preferred operation steel rolls 142 are spaced a slight distance above the expected top surface of the glass sheet G, e.g., 0.002 inch. Of course, because of the construction for mounting rolls 142, a considerable increase in thickness of a portion of a sheet will result in contact with roll 142 and it can move upwardly thereby raising rods 147.

The foregoing description has illustrated the crusher assembly of the present invention as used in glass sheet washers. This description is by way of illustration and not a limitation of the present invention. The method of the invention will obviously be applicable with other apparatus. For example, a steel platen can be brought down against a supported glass sheet so that the platen will crush the glass chips. The platen is brought down an insufficient distance to provide pressure on the glass sheet that would fracture the glass sheet. Then the smaller glass particles are removed by brushing. Likewise a rigid tool can be manually pressed against glass chips on a glass surface to crush them into smaller glass particles which can then be removed by mechanical brushing or by hand brushing. The invention is to be limited only by the claims which follow:

I claim:

1. A method for the removal of a glass chip on a surface of a glass sheet having substantially the same chemical composition as the glass chip which comprises supporting the glass sheet, pressing a body having a rigid contacting portion against the glass chip only on the supported sheet with a force sufficient to pulverize said chip to form smaller glass particles, and removing the glass particles from the glass sheet.

2. A method for the removal of a glass chip on a surface of a glass sheet having substantially the same chemical composition as the glass chip which comprises supporting the glass sheet, providing relative movement between the supported glass sheet and a body having a rigid contacting portion until the body presses against said chip only, continuing the relative movement to increase the pressure of the body against said chip to pulverize said chip to form smaller glass particles, and removing the glass particles from the glass sheet.

3. A method for the removal of a glass chip on a surface of a glass having substantially the same chemical composition as the glass chip sheet which comprises moving the glass sheet in a path, supporting a rotatable roll having a rigid contacting portion in the path of movement of the glass chip only on the surface of the glass sheet provided by the movement of said glass sheet, maintaining the roll in the path of movement of the glass chip only with sufficient force to pulverize said chip to form smaller glass particles and removing the glass particles from the glass sheet.

4. A method for the removal of a glass chip on a surface of a flat glass sheet having substantially the same chemical composition as the glass chip which comprises moving the sheet in a plane, supporting a rotatable roll having a rigid contacting portion and having part of said portion of the roll in the plane of movement of the glass chip only, maintaining the roll in said supported position whereby the glass chip is pressed between the roll and the glass sheet to form smaller glass particles and removing the glass particles from the glass sheet.

5. An apparatus for the removal of glass chips from a surface of a glass sheet which comprises a conveyor to move the glass sheet only in a horizontal path, a roll having a rigid contacting portion rotatively mounted about a horizontal axis transverse to the path of movement of the glass sheet provided by said conveyor, and means for supporting said roll in the path of the glass chips and in a position spaced from the path of movement of the surface of the glass sheet opposing said roll.

6. An apparatus for the removal of glass chips from both surfaces of a glass sheet which comprises a conveyor to move the glass sheet in a horizontal path, rolls, each having a rigid contacting portion and rotatably mounted about a horizontal axis transverse to the path of movement of the glass sheet provided by said conveyor, and means for supporting said rolls, one of said rolls being supported in the path of travel of the glass chips on one surface of the glass sheet and another of said rolls being supported in the path of travel of the glass chips on the other surface of the glass sheet, each roll being spaced from the paths of travel of the surfaces of the glass sheet provided by said conveyor.

7. An apparatus for the removal of glass chips from a surface of a glass sheet which comprises a conveyor for the glass sheet including pairs of resilient pinch rolls mounted for rotation about parallel axes to move the glass sheet between each pair of resilient rolls in a flat path and means for rotating said resilient rolls, a pair of opposed rolls rotatably mounted each about an axis parallel to the axes of rotation of said resilient rolls and mounted on opposite sides of said path of movement and between the pairs of said resilient rolls, and means for supporting said opposed rolls, at least one of said opposed rolls being a roll having a rigid contacting portion and being mounted in the path of travel of the glass chips and substantially out of the path of travel of the glass sheet surface opposing said roll having the rigid contacting portion.

8. An apparatus for the removal of glass chips from both surfaces of a glass sheet which comprises a conveyor to move the glass sheet in a horizontal path, rolls, each having a rigid contacting portion and rotatably mounted about a horizontal axis transverse to the path of movement of the glass sheet provided by said conveyor, brush rolls rotatably mounted to contact the glass sheet during said movement of the sheet provided by said conveyor and adjustable means for supporting said rolls, one of said rolls being supported in the path of travel of the glass chips on one surface of the glass sheet and another of said rolls being supported in the path of travel of the glass chips on the other surface of the glass sheet, each roll being spaced from the paths of travel of the surfaces of the glass sheet provided by said conveyor.

9. An apparatus for the removal of glass chips from a surface of a glass sheet which comprises a conveyor for the glass sheet including pairs of resilient rolls mounted for rotation about parallel axes to move a glass sheet between said pairs in a horizontal direction and means for driving said pairs of resilient rolls, a pair of opposed rolls between two pairs of said resilient rolls and rotatably mounted about axes parallel to the axes of rotation of said resilient rolls, at least one of said opposed rolls being a roll having a rigid contacting portion, means for supporting said roll having the rigid contacting portion spaced from the travel of the glass sheet provided by the resilient rolls and positioned in the path of travel of the glass chips.

10. An apparatus for the washing of glass sheets including removal of glass chips which comprises a supporting structure, pairs of resilient rolls mounted for rotation about parallel axes to the supporting structure to move a glass sheet between said pairs in a horizontal direction, means for driving said pairs of resilient rolls, pairs of brush rolls rotatably mounted to the supporting structure between pairs of resilient rolls to engage the glass sheet moved by said pairs of resilient rolls, means for driving said pairs of brush rolls, a pair of opposed rolls between two pairs of said brush rolls and rotatably mounted to the supporting structure about axes parallel to the axes of rotation of said resilient rolls and brush rolls, at least one of said opposed rolls being a roll having a rigid contacting portion, and means for supporting said roll having the rigid contacting portion spaced from the travel of the glass sheet provided by the resilient rolls and positioned in the path of travel of the glass chips.

11. The apparatus of claim 10 wherein the roll having the rigid contacting portion is the top roll of the pair of opposed rolls and wherein the support means for the roll having the rigid contacting portion includes bearings supported by rods depending from the supporting structure, said rods having threaded top ends provided with nuts resting on the supporting structure.

12. The apparatus of claim 11 and further including liquid spray means for feeding water to said brush rolls.

References Cited in the file of this patent

UNITED STATES PATENTS

| | | |
|---|---|---|
| 1,198,346 | Hake | Sept. 12, 1916 |
| 1,317,714 | Locke | Oct. 7, 1919 |
| 1,953,352 | Kranich | Apr. 3, 1934 |
| 2,095,697 | Hammer | Oct. 12, 1937 |
| 2,189,578 | Crouse et al. | Feb. 6, 1940 |
| 2,211,838 | Riggs | Aug. 20, 1940 |

UNITED STATES PATENT OFFICE

CERTIFICATE OF CORRECTION

Patent No. 2,915,423 December 1, 1959

Herman R. Marini

It is hereby certified that error appears in the printed specification of the above numbered patent requiring correction and that the said Letters Patent should read as corrected below.

Column 4, line 24, for "oppoiste" read -- opposite --; column 6, line 1, after "glass" insert -- sheet --; line 2, after "chip" strike out -- sheet --.

Signed and sealed this 11th day of October 1960.

(SEAL)
Attest:
KARL H. AXLINE
Attesting Officer

ROBERT C. WATSON
Commissioner of Patent